US008337934B2

(12) United States Patent
Kunert et al.

(10) Patent No.: US 8,337,934 B2
(45) Date of Patent: Dec. 25, 2012

(54) METHOD OF MAKING BACON PIECES

(75) Inventors: Gale F. Kunert, Austin, MN (US);
Steven C. Wobschall, Austin, MN (US);
John A. Bungum, Austin, MN (US);
Larry G. Huston, Austin, MN (US)

(73) Assignee: Hormel Foods Corporation, Austin, MN (US)

( * ) Notice: Subject to any disclaimer, the term of this patent is extended or adjusted under 35 U.S.C. 154(b) by 1819 days.

(21) Appl. No.: 11/043,440

(22) Filed: Jan. 26, 2005

(65) Prior Publication Data
US 2006/0165862 A1 Jul. 27, 2006

(51) Int. Cl.
*A23L 1/31* (2006.01)
*A23P 1/08* (2006.01)

(52) U.S. Cl. ..................... 426/645; 426/641

(58) Field of Classification Search ............. 426/641, 426/645
See application file for complete search history.

(56) References Cited

U.S. PATENT DOCUMENTS

| | | | |
|---|---|---|---|
| 1,863,609 A | 6/1932 | Vanderkloot | |
| 1,928,877 A | 10/1933 | Britt et al. | |
| 1,962,877 A | 6/1934 | Roth et al. | |
| 2,158,702 A | 5/1939 | Kipper | |
| 2,431,253 A | 11/1947 | Hoy | |
| 3,385,203 A | 5/1968 | Foldenauer | |
| 3,595,679 A | 7/1971 | Schoch et al. | |
| 3,873,755 A | 3/1975 | McKay | |
| 3,890,451 A | 6/1975 | Keszler | |
| 3,901,981 A | 8/1975 | Draudt | |
| 3,997,672 A | 12/1976 | Stead et al. | |
| 4,029,824 A * | 6/1977 | Langen | 426/281 |
| 4,036,997 A | 7/1977 | VerBurg | |
| 4,038,426 A * | 7/1977 | Jespersen et al. | 426/266 |
| 4,132,810 A | 1/1979 | Knutson | |
| 4,169,161 A | 9/1979 | Leidy et al. | |
| 4,218,492 A | 8/1980 | Stead et al. | |
| 4,409,704 A | 10/1983 | Seiffhart | |
| 4,446,159 A | 5/1984 | Roth | |
| 4,548,108 A | 10/1985 | Dennis | |
| 4,552,768 A | 11/1985 | Olander | |
| 4,603,053 A | 7/1986 | Vegas | |
| 4,657,711 A * | 4/1987 | Wigley | 261/79.2 |
| 4,731,906 A | 3/1988 | Matthews et al. | |
| 4,753,809 A * | 6/1988 | Webb | 426/235 |
| 4,812,320 A | 3/1989 | Ruzek | |
| 4,957,271 A | 9/1990 | Summers et al. | |
| 4,957,756 A * | 9/1990 | Olander et al. | 426/243 |
| 4,960,599 A | 10/1990 | Cozzini et al. | |
| 4,967,652 A | 11/1990 | Mally | |
| 5,052,975 A | 10/1991 | Handel | |
| 5,064,667 A | 11/1991 | Mally | |
| 5,071,666 A | 12/1991 | Handel | |
| 5,132,126 A | 7/1992 | Sinkler et al. | |
| 5,472,722 A * | 12/1995 | Burger | 426/264 |
| 5,520,944 A | 5/1996 | Richardson et al. | |
| 5,567,460 A | 10/1996 | Afman | |
| 5,637,342 A | 6/1997 | Brooks et al. | |
| 5,690,989 A | 11/1997 | Clarke et al. | |
| 5,798,133 A | 8/1998 | Kunert | |
| 5,837,305 A | 11/1998 | Kunert | |
| 5,997,925 A | 12/1999 | Wilson et al. | |
| 6,051,264 A * | 4/2000 | Afman et al. | 426/243 |
| 6,214,393 B1 * | 4/2001 | Afman et al. | 426/243 |
| 6,224,927 B1 | 5/2001 | Paulos et al. | |
| 6,391,355 B1 | 5/2002 | Kunert et al. | |
| 6,506,108 B1 | 1/2003 | Jagusch | |
| 6,669,974 B2 | 12/2003 | Weldy et al. | |
| 6,699,520 B2 | 3/2004 | Paulos et al. | |
| 6,834,576 B2 | 12/2004 | Leitinger | |
| 7,008,657 B2 | 3/2006 | Falk et al. | |
| 2004/0086610 A1 | 5/2004 | Allan Falk et al. | |
| 2004/0096555 A1 | 5/2004 | Gould et al. | |
| 2006/0165862 A1 | 7/2006 | Kunert et al. | |
| 2007/0110884 A1 | 5/2007 | Kay | |

OTHER PUBLICATIONS

Komarik, S. et al. 1974. Food Products Formulary, vol. 1 Meats. Poultry, Fish, Shellfish. The AVI Publishing Company, INc., Westport, CT, p. 19-23.*
Jay, James, 1970. Modern Food Microbiology. Van Nostrand Co, New York, p. 31-32.*
Romans, et al. 1974. The Meat We Eat. The Interstate Printers & Publishers, Inc., Danville, Illinois, p. 571-577.*
British Meat, Step-by-Step Guides, No. 1. Dry Curing Bacon.
Meat Science on Web. http://labs.ansci.uiuc.edu/meatscience/Library/curing.htm, Oct. 28, 2008.
Morton® Salt, Morton® Smoke Flavored Sugar Cure®. http://www.mortonslat.com/products/mearcuring/smkeflavor.html, Nov. 20, 2008.
Oklahoma State University, "Meat Curing", Oklahoma Cooperative Extension Service ANSI-3994-2.

\* cited by examiner

*Primary Examiner* — Carolyn Paden
(74) *Attorney, Agent, or Firm* — IPLM Group, P.A.

(57) ABSTRACT

One aspect of the present invention method of making bacon pieces comprises placing bellies in a vessel. Dry cure ingredients and water are added in the vessel containing the bellies. The dry cure ingredients and the water create a cure ingredients solution, which includes up to 3.0% water by weight of the bellies. The bellies and the cure ingredients solution are tumbled in the vessel under vacuum to create cured bellies. The cured bellies are cooked to a desired cook level. The up to 3.0% water by weight of the bellies allows the cured bellies to be cooked to the desired cook level in only one cooking step.

33 Claims, 3 Drawing Sheets

METHOD OF MAKING BACON PIECES

FIELD OF THE INVENTION

The present invention relates to a method of making bacon pieces from whole pork bellies and from pork belly trim and belly pieces.

BACKGROUND

Whole pork bellies come from the side of the hog and are commonly used to make bacon strips. Pork belly trim and belly pieces come from trimming whole pork bellies and are typically irregular in size and in shape. Pork belly trim and belly pieces are commonly used to make sausage, bacon bits, and bacon topping. The term "bellies" is used herein to refer to whole bellies, belly trim, and belly pieces. The term "bacon pieces" is used herein to refer to bacon strips, bacon bits, and bacon topping.

Federal regulation defines the weight and the yield of bacon products. For uncooked bacon products, cured bellies must have a weight not exceeding the weight of uncured bellies, which is commonly referred to as "green weight". For fully cooked bacon products, cured bellies must have a yield of not more than 40% of the weight of uncured bellies, in other words 60% shrinkage from the green weight of uncured bellies.

Commonly, cure ingredients are injected into bellies with injection needles to create cured bellies, and the cure ingredients must be in solution to prevent clogging of the injection needles. The term "in solution" is used herein to refer to a substantially homogeneous mixture created by a process by which a solid, liquid, or gaseous substance is substantially homogeneously mixed with a liquid. Should the injection needles become clogged, there will be an uneven distribution of the cure ingredients in the bellies.

Most cured bellies are cured using a cure ingredients solution, which comprises dry cure ingredients in a water solution. The cure ingredients solution contains 60 to 70% water by weight of the cure ingredients solution. The bellies are injected with the cure ingredients solution at levels of 8 to 13% by weight of the bellies so that the injected bellies contain 5 to 9% water by weight of the injected bellies, which adds to the weight of the bellies. To reduce the weight of the injected bellies, to return the injected bellies to their green weight, the injected bellies are commonly cooked slowly in a smokehouse. Cooking the injected bellies in a smokehouse cooks off the water, leaving the cure ingredients behind, and also adds a smoke flavor to the cured bellies.

For fully cooked bacon products, additional weight reduction is necessary after cooking in a smokehouse. To comply with federal regulation, fully cooked bacon products must have a yield of 40% or less to be considered fully cooked. The cured bellies are further cooked using a microwave oven, a conveyor belt having a heat conductive surface, a conveyor belt passing through one or more cooking chambers, or other suitable cooking devices well known in the art to get fully cooked bacon products to 40% yield or less.

SUMMARY OF THE INVENTION

In one aspect of the present invention, bellies are placed in a vessel. Dry cure ingredients and water are added in the vessel containing the bellies. The dry cure ingredient and the water create a cure ingredients solution, which includes up to 3.0% water by weight of the bellies. The bellies and the cure ingredients solution are tumbled in the vessel under vacuum to create cured bellies. The cured bellies are cooked to a desired cook level. The up to 3.0% water by weight of the bellies allows the cured bellies to be cooked to the desired cook level in only one cooking step.

In another aspect of the present invention, whole bellies are placed in a vessel. Dry cure ingredients and water are added in the vessel containing the whole bellies. The dry cure ingredients and the water create a cure ingredients solution, which includes up to 3.0% water by weight of the whole bellies. The whole bellies and the cure ingredients solution are tumbled in the vessel under vacuum to create cured whole bellies. The cured whole bellies are cooked to a desired cook level. The up to 3.0% water by weight of the whole bellies allows the cured whole bellies to be cooked in only one cooking step.

In another aspect of the present invention, belly pieces are placed in a vessel. Dry cure ingredients and water are added in the vessel containing the belly pieces. The dry cure ingredients and the water create a cure ingredients solution, which includes up to 3.0% water by weight of the belly pieces. The belly pieces and the cure ingredients solution are tumbled in the vessel under vacuum to create cured belly pieces. The cured belly pieces are cooled, sliced, and cooked to a desired cook level. The up to 3.0% water by weight of the belly pieces allows the cured belly pieces to be cooked in only one cooking step.

In another aspect of the present inventions belly pieces are sliced to a thickness of approximately 3 to 6 mm and placed in a vessel. Dry cure ingredients and water are added in the vessel containing the belly pieces. The dry cure ingredients and the water create a cure ingredients solution, which includes up to 3.0% water by weight of the belly pieces. The belly pieces and the cure ingredients solution are tumbled in the vessel under vacuum to create cured belly pieces. The cured belly pieces are cooked to a desired cook level. The up to 3.0% water by weight of the belly pieces allows the cured belly pieces to be cooked in only one cooking step.

DETAILED DESCRIPTION OF A PREFERRED EMBODIMENT

The present invention relates to a method of making pre-cooked or par-cooked bacon pieces from whole pork bellies and from pork belly trim and belly pieces. Whole bellies are preferably used to make bacon strips, and belly trim and belly pieces are preferably used to make bacon bits or bacon topping. The belly trim and belly pieces are a raw material from trimming of the whole bellies before the whole bellies are processed and are typically irregular in size and in shape. For example, the belly trim and belly pieces may be the whole pieces of trim from the belly of the hog as the hog is cut into wholesale cuts or the irregular belly trim and belly pieces as the bellies are trimmed before pumping.

The term "bellies" is used herein to refer to whole bellies, belly trim, and belly pieces. The term "bacon pieces" is used herein to refer to bacon strips, bacon bits, and bacon topping.

Although the present invention is described with regard to making bacon pieces from bellies, it is recognized that a variety of products can be made from other suitable cuts from the hog using the method of the present invention. Therefore, the term bellies also includes other suitable cuts from the hog and the term bacon pieces also includes the products made from the other suitable cuts from the hog.

Figure 1:
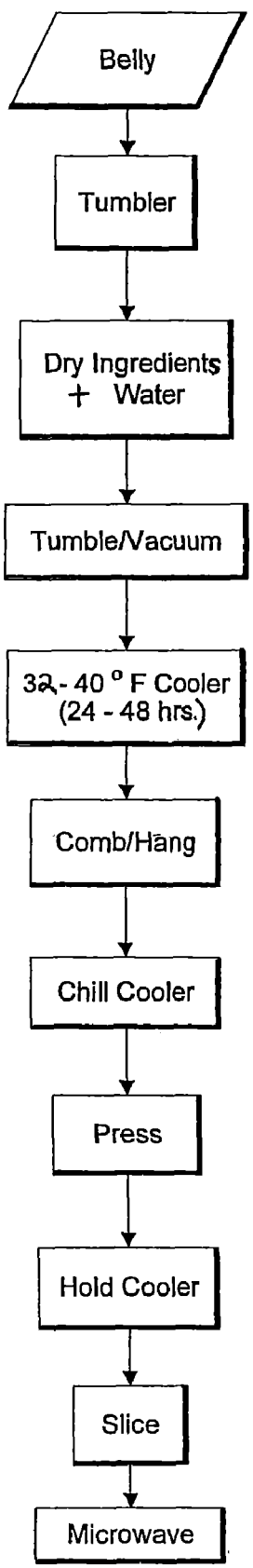
FIG. 1 is a schematic flow diagram for an embodiment using whole bellies according to the principles of the present invention.

In one aspect of the present invention, uncooked whole bellies are preferably used to make bacon strips. An example of this aspect is shown in FIG. 1. The uncooked whole bellies are added to a vessel such as a vacuum tumbler. A cure ingredients solution comprising dry cure ingredients and water is then added to the tumbler containing the whole bellies. The cure ingredients solution does not have to be in solution, the term "in solution" meaning a substantially homogeneous mixture created by a process by which a solid, liquid, or gaseous substance is substantially homogeneously mixed with a liquid. Preferably, the approximate percentages of the ingredients in the cure ingredients solution by weight of the uncooked whole bellies are 1.0 to 2.0% salt, 0.0 to 2.0% sugar or sweetener, 0.0 to 5.0% smoke flavoring, 0.0 to 0.5% phosphates, 120 ppm or less sodium nitrite, 550 ppm or less sodium erythorbate or sodium ascorbate, and 1.0% water.

Preferably first water, salt, and sodium nitrite are added to the tumbler and mixed with the whole bellies for 2 to 4 minutes at 10 rpm. The sodium nitrite, which gives the cured whole bellies the cured color, is preferably added to the water to more evenly distribute the sodium nitrite amongst the whole bellies. It is preferred that up to 3.0% water be used, and it is more preferred that 1.0% water be used. Sugar, dextrose, and sodium erythorbate are then added to the tumbler and mixed with the whole bellies and other ingredients for 2 to 4 minutes at 10 rpm. Smoke flavoring is then added and mixed for an additional 2 to 4 minutes at 10 rpm. It is recognized that the speed of the tumbler depends upon the type of tumbler being used, and any suitable speed may be used as long as the whole bellies are not torn or otherwise damaged.

The tumbler is closed and a vacuum is applied during tumbling of the whole bellies and the cure ingredients solution to create cured whole bellies. Preferably, the mixture is tumbled at 10 rpm for approximately 2 hours, and a vacuum of 28.0 to 29.5 inches Hg is applied during tumbling. The vacuum is applied to open the muscle fibers of the whole bellies, which allows for better penetration of the cure ingredients solution in the whole bellies. It is recognized that a lower vacuum level may be used, but the whole bellies and the cure ingredients solution may need to be tumbled under vacuum for a longer period of time to allow for adequate penetration of the cure ingredients solution in the whole bellies. The cured whole bellies are removed from the tumbler and either hung on racks using bacon combs, as in the example shown in FIG. 1, or placed in vats. The cured whole bellies are then stored in a cooler having a temperature of approximately 32 to 40° F. for up to 48 hours, preferably 24 to 48 hours. Then, the cured whole bellies are stored in a chill cooler having a temperature of approximately 18 to 26° F. for approximately 24 to 48 hours, until ready to press. The cured whole bellies are then pressed and held in a cooler having a temperature of approximately 18 to 26° F. for approximately 24 to 72 hours, until ready for slicing.

As in the example shown in FIG. 1, the cured whole bellies are combed, also commonly referred to as pinned, and then hung to place the cured whole bellies in a vertical position, which assists in straightening out the cured whole bellies that have become distorted during tumbling. The combing and the hanging of the cured whole bellies assists in pressing the cured whole bellies straighter. Pressing the cured whole bellies makes the cured whole bellies more uniform for slicing. During pressing, the cured whole bellies are placed in a slot in the press, pushed around the edges to compress the cured whole bellies, and preferably formed into a rectangular block to form a more uniform shape. The rectangular shape of the cured whole bellies is more easily guided during slicing thereby resulting in more uniform slices.

The cured whole bellies are preferably sliced to a desired thickness according to customer specifications. After the cured whole bellies have been sliced, they are preferably cooked to a desired water activity level. To be fully cooked, the cured whole bellies must have a yield of not more than 40% of the weight of uncured whole bellies, in other words 60% shrinkage from the green weight of uncured whole bellies. To be par-cooked, the cured whole bellies must have less than 60% shrinkage from the green weight of uncured whole bellies. If it is desired to create a shelf stable product, the desired water activity level is 0.85 or less. If it is desired to create a product that must be refrigerated, the desired water activity level is 0.92 or less. The cured whole bellies may be cooked in a microwave oven, a conveyor belt having a heat conductive surface, a conveyor belt passing through one or more cooking chambers, or other suitable cooking devices well known in the art. The cook level is determined by the slice thickness and the customer specifications as to the shrinkage percentage from the green weight. The cooked, cured whole bellies may then be chilled and packaged.

Although it is preferred that up to 3.0% water by weight of the uncooked whole bellies be used, and it is more preferred that 1.0% water be used, it is recognized that a greater percentage of water may be used, but this would lengthen the cooking time. It is also recognized that only a sufficient amount of water to evenly distribute the sodium nitrite in the whole bellies is needed.

Figure 2:
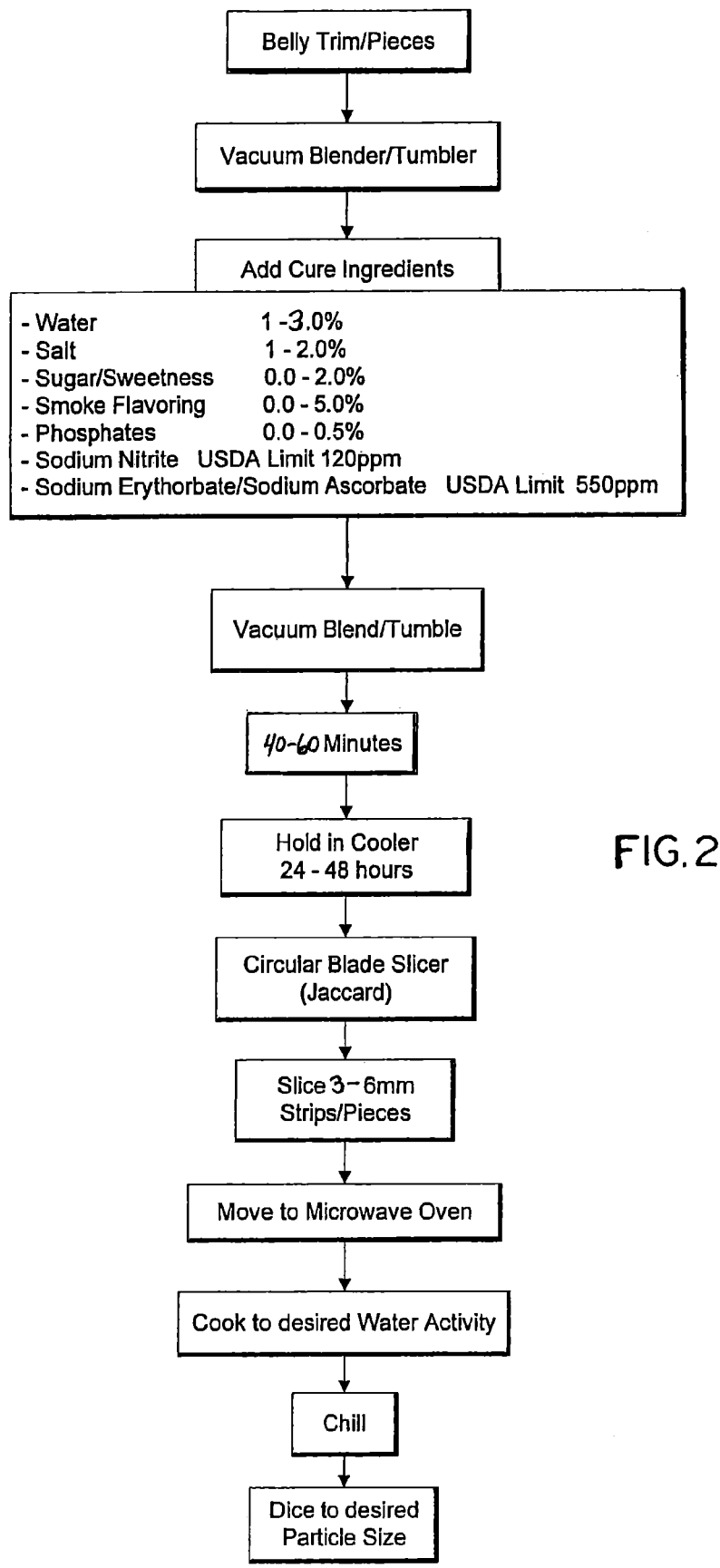
FIG. 2 is a schematic flow diagram for an embodiment using belly trim and belly pieces according to the principles of the present invention.

In another aspect of the present invention, belly trim and belly pieces are preferably used to make bacon bits or bacon topping. For ease of reference, the belly trim and belly pieces will be referred to hereafter as belly pieces. An example of this aspect is shown in FIG. 2. The belly pieces are placed in a vessel such as a vacuum tumbler. A cure ingredients solution comprising dry cure ingredients and water is then added to the tumbler containing the belly pieces. The cure ingredients solution does not have to be in solution. Preferably, the percentages of the ingredients in the cure ingredients solution by weight of the belly pieces are 1.0 to 2.0% salt, 0.0 to 2.0% sugar or sweetener, 0.0 to 5.0% smoke flavoring, 0.0 to 0.5% phosphates, 120 ppm or less sodium nitrite, 550 ppm or less sodium erythorbate or sodium ascorbate, and 1.0% water.

The sodium nitrite, which gives the cured belly pieces the cured color, is preferably added to the water to more evenly distribute the sodium nitrite amongst the belly pieces. It is preferred that up to 3.0% water be used, and it is more preferred that 1.0% water be used. The belly pieces and the cure ingredients solution are preferably tumbled at 10 rpm for approximately 40 to 60 minutes under a vacuum of 28.0 to 29.5 inches Hg to create cured belly pieces. Tumbling under vacuum allows for better penetration of the cure ingredients solution in the belly pieces. It is recognized that the speed of the tumbler depends upon the type of tumbler being used, and any suitable speed may be used as long as the belly pieces are not torn or otherwise damaged.

Although it is preferred that up to 3.0% water by weight of the uncooked belly pieces be used, and it is more preferred that 1.0% water be used, it is recognized that a greater percentage of water may be used, but this would lengthen the cooking time. It is also recognized that only a sufficient amount of water to evenly distribute the sodium nitrite in the belly pieces is needed.

The cured belly pieces are then held in a cooler for up to 48 hours, preferably 24 to 48 hours. The cured belly pieces may then be sliced so that the cured belly pieces have a more uniform thickness. Preferably, the cured belly pieces are passed through a set of circular slicing knives such as a Jaccard Sectomatic Rotary Blade Slicer. The blade setting can be adjusted to the desired thickness. Preferably, the cured belly pieces are sliced to 3 to 6 mm, more preferably 3 to 4 mm, in thickness. The irregularity of the thicknesses of the cured belly pieces does not matter as they have a tendency of cooking together, and then they may be broken apart during dicing into smaller pieces.

After the cured belly pieces have been sliced, they are cooked to a desired water activity level. To be fully cooked, the cured belly pieces must have a yield of not more than 40% of the weight of uncured belly pieces, in other words 60% shrinkage from the green weight of uncured belly pieces. If it is desired to create a shelf stable product, the desired water activity level is 0.85 or less. If it is desired to create a product that must be refrigerated, the desired water activity level is 0.92 or less. The cured belly pieces may be cooked in a microwave oven, a conveyor belt having a heat conductive surface, a conveyor belt passing through one or more cooking chambers, or other suitable cooking devices well known in the art. The cured belly pieces are cooked to the cook level determined by the customer specifications. The cooked, cured belly pieces may then be chilled, optionally diced to a desired size, and packaged. Whole, irregular belly pieces or slices are preferably used and are diced to provide a shredded appearance for use as a bacon topping. It is recognized that other types of belly pieces could be used.

Figure 3:
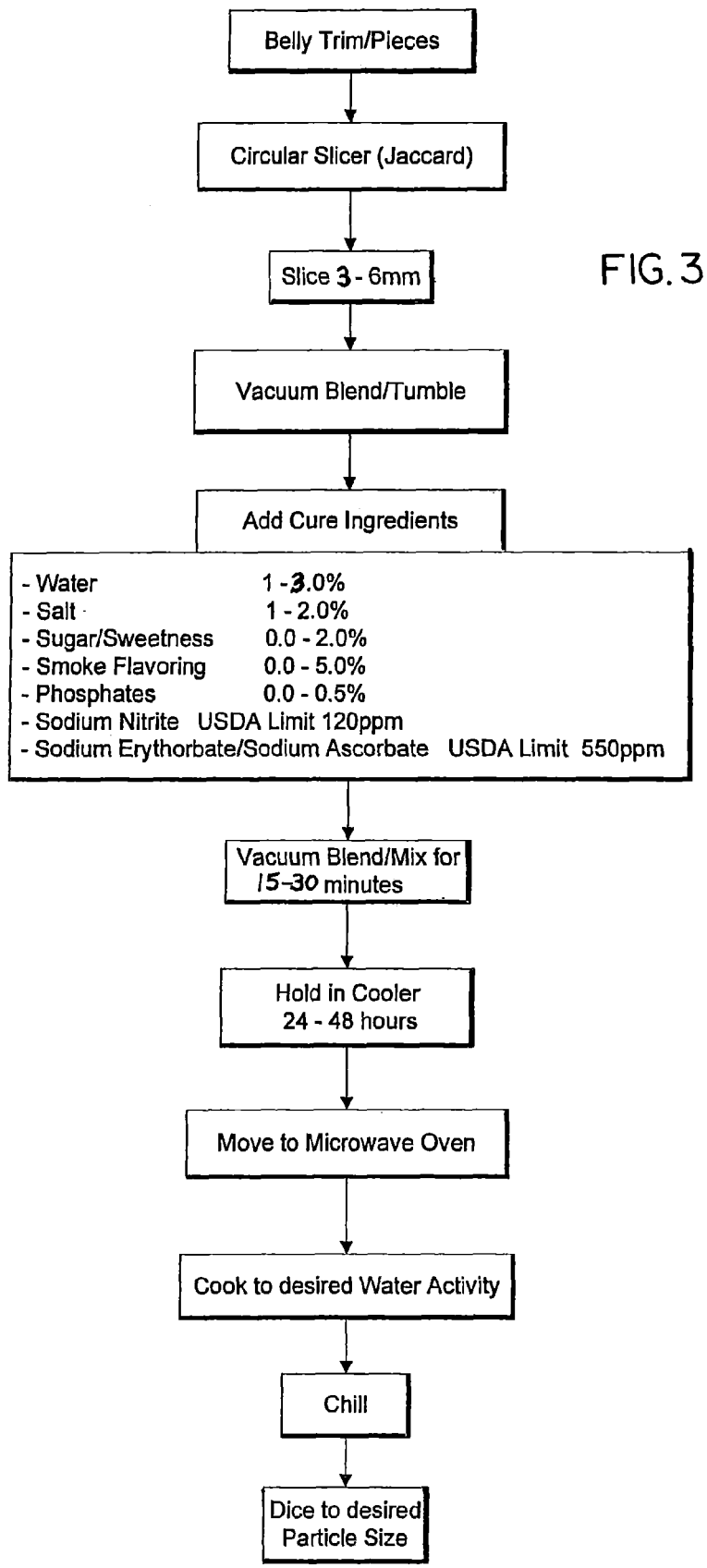
FIG. 3 is a schematic flow diagram for another embodiment using belly trim and belly pieces according to the principles of the present invention.

Alternatively, in another example shown in FIG. 3, the belly pieces may be sliced to a thickness of 3 to 6 mm, preferably 3 to 4 mm, before tumbling the belly pieces with the cure ingredients solution under vacuum. Because the belly pieces are sliced, more surface area is exposed to the cure ingredients solution and the time for tumbling under vacuum may be reduced to approximately 15 to 30 minutes. The cured belly pieces may be held for up to 48 hours in a cooler, cooked to a desired water activity level, and similarly processed for packaging.

Preferably for this example, encapsulated salt is used to ensure that the belly pieces do not stick together. The encapsulated salt is encased in a high temperature fat which typically melts at approximately 140° F. An example of such encapsulated salt is Cap-Shure® salt by Balchem Corporation. Since the protein of the belly pieces becomes denatured at approximately 120° F., the protein becomes denatured before the salt is released from the fat encasing the salt. The use of encapsulated salt allows the cured belly pieces to reach a temperature of approximately 120° F. without the salt contacting the protein. At 120° F., the protein is denatured and the salt may then be added without the clumping that occurs when salt is added prior to the denaturing of the protein.

The present invention allows for the use of belly pieces without requiring the step of stuffing the belly pieces into a casing, a log, and/or a loaf, cooking the stuffed belly pieces in a smokehouse, and then freezing the stuffed belly pieces so that they may be sliced prior to cooking to a desired water activity level.

Among the advantages of the present invention, the relatively small amount of water in the cure ingredients solution allows for the belly pieces to return to their green weight faster and easier using less energy thereby resulting in a more economical process. Only a sufficient amount of water to evenly distribute the sodium nitrite in the belly pieces is needed, and the cure ingredients solution does not need to be in solution. Because the belly pieces do not include excess water, such as by injection, the belly pieces do not need to be dried in a smokehouse prior to cooking to the desired cook level. In addition, the reduced thickness of the belly pieces prior to cooking assists in reducing the time needed to achieve the desired cook level.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A method of making bacon pieces, comprising:
   a) placing bellies in a vessel;
   b) adding dry cure ingredients and adding water to create a cure ingredients solution, the cure ingredients solution including 1.0 to 3.0% water by weight of the bellies;
   c) tumbling the bellies and the cure ingredients solution in the vessel under vacuum to create tumbled bellies;
   d) storing the tumbled bellies in a cooler for 24 to 48 hours to create cured bellies; and
   e) cooking the cured bellies to a desired cook level, the 1.0 to 3.0% water by weight of the bellies allowing the cured bellies to be cooked to the desired cook level in only one cooking step.

2. The method of claim 1, wherein the bellies and the cure ingredients solution are tumbled at approximately 10 rpm under a vacuum level of 28.0 to 29.5 inches Hg.

3. The method of claim 1, wherein the bellies and the cure ingredients solution are tumbled under vacuum for approximately 2 hours to create cured bellies.

4. The method of claim 1, wherein the cured bellies are cooked to a water activity level of 0.85 or less.

5. The method of claim 1, wherein the cured bellies are fully cooked.

6. The method of claim 1, wherein the bellies are belly trim and belly pieces.

7. The method of claim 6, further comprising:
   a) chilling the cured bellies after cooking the cured bellies to the desired cook level; and
   b) dicing the chilled cured bellies to a desired size.

8. The method of claim 6, further comprising slicing the bellies to 3 to 6 mm.

9. The method of claim 8, wherein the bellies are sliced before the bellies are cured.

10. The method of claim 8, wherein the bellies are sliced after the bellies are cured.

11. The method of claim 1, wherein the bellies are whole bellies.

12. The method of claim 11, further comprising:
   a) combing and hanging the cured whole bellies;
   b) chilling the cured whole bellies;
   c) pressing the cured whole bellies; and
   d) slicing the cured whole bellies prior to cooking the cured whole bellies to a desired cook level.

13. The method of claim 1, wherein the cured bellies are cooked using a microwave oven.

14. The method of claim 1, wherein the cure ingredients solution includes 1.0 to 2.0% salt, 0.0 to 2.0% sweetener, 0.0 to 5.0% smoke flavoring, 0.0 to 0.5% phosphates, 120 ppm or less sodium nitrite, 550 ppm or less sodium erythorbate or sodium ascorbate, and 1.0 to 3.0% water by weight of the bellies.

15. A method of making bacon pieces, comprising:
   a) placing whole bellies in a vessel;
   b) adding dry cure ingredients and adding water to create a cure ingredients solution, the cure ingredients solution including 1.0 to 3.0% water by weight of the whole bellies;
   c) tumbling the whole bellies and the cure ingredients solution in the vessel under vacuum to create tumbled whole bellies;
   d) storing the tumbled whole bellies in a cooler for 24 to 48 hours to create cured whole bellies; and
   e) cooking the cured whole bellies to a desired cook level, the 1.0 to 3.0% water by weight of the whole bellies allowing the cured whole bellies to be cooked in only one cooking step.

16. The method of claim 15, wherein the whole bellies and the cure ingredients solution are tumbled at approximately 10 rpm under a vacuum level of 28.0 to 29.5 inches Hg for approximately 2 hours.

17. The method of claim 15, further comprising:
   a) hanging the cured whole bellies after tumbling the whole bellies and the cure ingredients solution in the vessel under vacuum;
   b) pressing the cured whole bellies; and
   c) slicing the cured whole bellies before cooking the cured whole bellies to the desired cook level.

18. The method of claim 17, wherein the cured whole bellies are hung and stored in a cooler having a temperature of approximately 32 to 40° F. for up to 48 hours.

19. The method of claim 15, wherein the cured whole bellies are stored in a cooler having a temperature of approximately 32 to 40° F. for up to 48 hours.

20. The method of claim 15, wherein the cured whole bellies are cooked to a water activity level of 0.85 or less.

21. The method of claim 15, wherein the cured whole bellies are cooked using a microwave oven.

22. The method of claim 15, wherein the cure ingredients solution includes 1.0 to 2.0% salt, 0.0 to 2.0% sweetener, 0.0 to 5.0% smoke flavoring, 0.0 to 0.5% phosphates, 120 ppm or less sodium nitrite, 550 ppm or less sodium erythorbate or sodium ascorbate, and 1.0 to 3.0% water by weight of the whole bellies.

23. A method of making bacon pieces, comprising:
   a) placing belly pieces in a vessel;
   b) adding dry cure ingredients and adding water to create a cure ingredients solution, the cure ingredients solution including 1.0 to 3.0% water by weight of the belly pieces;
   c) tumbling the belly pieces and the cure ingredients solution in the vessel under vacuum to create tumbled belly pieces;
   d) cooling the tumbled belly pieces for 24 to 48 hours to create cured belly pieces;
   e) slicing the cured belly pieces; and
   f) cooking the cured belly pieces to a desired cook level, the 1.0 to 3.0% water by weight of the belly pieces allowing the cured belly pieces to be cooked in only one cooking step.

24. The method of claim 23, wherein the belly pieces and the cure ingredients solution are tumbled at approximately 10 rpm under a vacuum level of 28.0 to 29.5 inches Hg for approximately 40 to 60 minutes.

25. The method of claim 23, wherein the cured belly pieces are sliced to a thickness of 3 to 6 mm.

26. The method of claim 23, wherein the cured belly pieces are cooked to a water activity level of 0.85 or less.

27. The method of claim 23, wherein the cured belly pieces are cooked using a microwave oven.

28. The method of claim 23, wherein the cure ingredients solution includes 1.0 to 2.0% salt, 0.0 to 2.0% sweetener, 0.0 to 5.0% smoke flavoring, 0.0 to 0.5% phosphates, 120 ppm or less sodium nitrite, 550 ppm or less sodium erythorbate or sodium ascorbate, and 1.0 to 3.0% water by weight of the belly pieces.

29. A method of making bacon pieces, comprising:
   a) slicing belly pieces to a thickness of approximately 3 to 6 mm;
   b) placing the belly pieces in a vessel;
   c) adding dry cure ingredients and adding water to create a cure ingredients solution, the cure ingredients solution including 1.0 to 3.0% water by weight of the belly pieces;
   d) tumbling the belly pieces and the cure ingredients solution in the vessel under vacuum to create tumbled belly pieces;
   e) storing the tumbled belly pieces in a cooler for 24 to 48 hours to create cured belly pieces; and
   f) cooking the cured belly pieces to a desired cook level, the 1.0 to 3.0% water by weight of the belly pieces allowing the cured belly pieces to be cooked in only one cooking step.

30. The method of claim 29, wherein the belly pieces and the cure ingredients solution are tumbled at approximately 10 rpm under a vacuum level of 28.0 to 29.5 inches Hg for approximately 15 to 30 minutes.

31. The method of claim 29, wherein the cured belly pieces are cooked to a water activity level of 0.85 or less.

32. The method of claim 29, wherein the cured belly pieces are cooked using a microwave oven.

33. The method of claim 29, wherein the cure ingredients solution includes 1.0 to 2.0% salt, 0.0 to 2.0% sweetener, 0.0 to 5.0% smoke flavoring, 0.0 to 0.5% phosphates, 120 ppm or less sodium nitrite, 550 ppm or less sodium erythorbate or sodium ascorbate, and 1.0 to 3.0% water by weight of the belly pieces.

* * * * *